United States Patent
Kubotera et al.

(10) Patent No.: US 7,499,645 B2
(45) Date of Patent: Mar. 3, 2009

(54) ELECTRONIC APPARATUS

(75) Inventors: Tomoyuki Kubotera, Tokyo (JP); Hirokuni Miyai, Tokyo (JP)

(73) Assignee: Sony Corporation, Tokyo (JP)

(*) Notice: Subject to any disclaimer, the term of this patent is extended or adjusted under 35 U.S.C. 154(b) by 881 days.

(21) Appl. No.: 10/536,622

(22) PCT Filed: Oct. 14, 2004

(86) PCT No.: PCT/JP2004/015565
§ 371 (c)(1), (2), (4) Date: May 26, 2005

(87) PCT Pub. No.: WO2005/038958
PCT Pub. Date: Apr. 28, 2005

(65) Prior Publication Data
US 2006/0071633 A1 Apr. 6, 2006

(30) Foreign Application Priority Data
Oct. 17, 2003 (JP) ............................. 2003-357569

(51) Int. Cl.
*G03B 17/02* (2006.01)
(52) U.S. Cl. .................................................... 396/539
(58) Field of Classification Search ................ 396/539, 396/278, 277; 320/112, 114, 113
See application file for complete search history.

(56) References Cited

U.S. PATENT DOCUMENTS

| | | | | |
|---|---|---|---|---|
| 4,937,606 A | * | 6/1990 | Soumi et al. | ................ 396/539 |
| 4,965,141 A | * | 10/1990 | Suzuki | ........................... 429/9 |
| 5,130,892 A | | 7/1992 | Satou | |
| 5,315,336 A | * | 5/1994 | Suzuka et al. | ............... 396/539 |
| 5,608,612 A | | 3/1997 | Hokao | |
| 2002/0014528 A1 | | 2/2002 | Shiue | |
| 2002/0048461 A1 | * | 4/2002 | Tanaka | ....................... 396/539 |

(Continued)

FOREIGN PATENT DOCUMENTS

DE   4323455   1/1994

(Continued)

*Primary Examiner*—Akm E Ullah
*Assistant Examiner*—Nguyen Tran
(74) *Attorney, Agent, or Firm*—Bell, Boyd & Lloyd LLP

(57) ABSTRACT

An electronic apparatus is provided. A component part containing chamber provided in the inside of a case constituting an armor of an electronic apparatus is so configured that a rectangular plate-like battery can be mounted and dismounted via a rectangular first opening opened in the lower surface of the case. One side wall in the vicinity of the first opening is provided with a second opening, and a component part containing space communicated with the second opening is provided in the inside of the case. A holder is provided which includes a first plate portion detachably attached to the second opening to shut off the second opening, and a second plate portion projecting from the first plate portion and extending in the component part containing space in the condition where the first plate portion shuts off the second opening, and a separable body is contained in the component containing space together with the holder. By this configuration, it is possible to provide an electronic apparatus which is not impaired in appearance quality and in which the operation of removing the separable body such as a secondary battery and electrical component parts at the time of discarding the electronic apparatus can be easily carried out.

11 Claims, 8 Drawing Sheets

U.S. PATENT DOCUMENTS

2002/0141756 A1* 10/2002 Kaedeoka ................... 396/539
2005/0281554 A1* 12/2005 Iwasa ......................... 396/539

FOREIGN PATENT DOCUMENTS

| | | |
|---|---|---|
| EP | 1 494 299 | 1/2005 |
| JP | 04-160751 | 6/1992 |
| JP | 07-114910 | 1/1995 |
| JP | 08-050884 | 2/1996 |
| JP | 08-255606 | 10/1996 |
| JP | 2002-287853 | 10/2002 |

\* cited by examiner

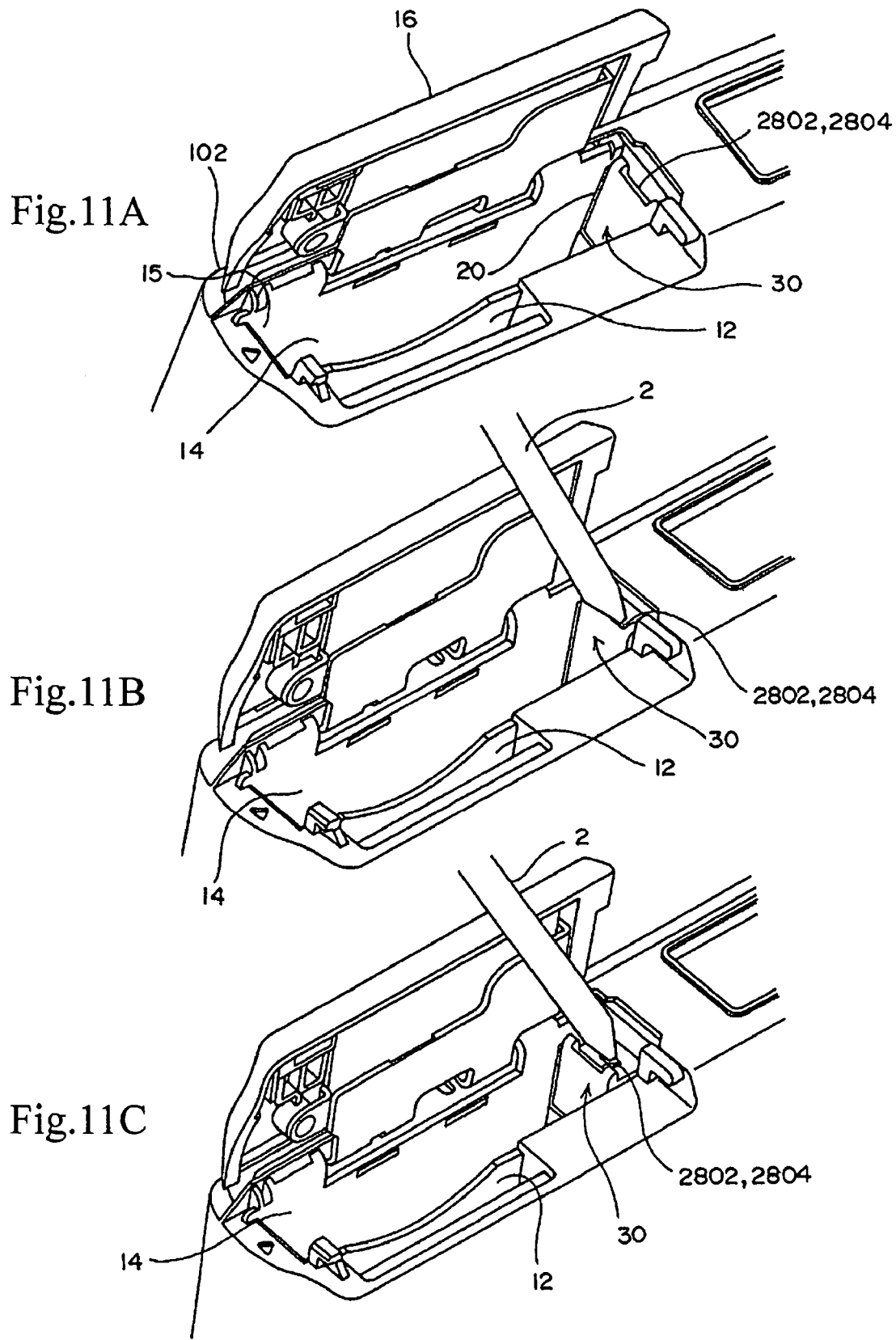

ELECTRONIC APPARATUS

CROSS REFERENCE TO RELATED APPLICATION

The present application claims priority to Japanese Patent Document No. P2003-357569 filed on Oct. 17, 2003, the disclosure of which is herein incorporated by reference.

BACKGROUND

The present invention relates to an electronic apparatus.

In recent years, laws or regulations related to recycling of batteries are executed in countries, and there is a demand for a structure such that electric component parts, a backup secondary battery and the like incorporated in an electronic apparatus can be easily removed from the electronic apparatus and separated from the electronic apparatus at the time of discarding the electronic apparatus.

For example, a configuration in which a secondary battery is preliminarily detachably attached to a printed wiring board disposed in the inside of a case constituting an armor of an electronic apparatus, a case portion fronting on the secondary battery is provided with an opening for removing the battery therethrough, and the opening is shut off with a lid, has been disclosed (see, for example, Japanese Patent Laid-open No. Hei 8-255606).

In such an electronic apparatus, the separation of the secondary battery from the electronic apparatus is conducted by removing the lid from the opening, removing the secondary battery from the printed wiring board, and drawing out the secondary battery to the exterior of the case.

However, in the above-mentioned electronic apparatus, the opening and the lid front on the outside of the case, so that they impair the appearance quality of the electronic apparatus.

In addition, there may be contemplated a structure in which such opening and lid are not provided and in which the secondary battery is taken out after disassembling the case. In this case, however, the operation of taking out the secondary battery is troublesome, which is poor in practicality.

SUMMARY

The present invention has been made in consideration of the above-mentioned circumstances. Accordingly, the present invention provides in an embodiment an electronic apparatus which is not impaired in appearance quality and in which a separable body such as a secondary battery and electric component parts can be easily removed at the time of discarding the electronic apparatus.

According to the present invention in an embodiment, there is provided an electronic apparatus including: a case constituting an armor; and a component part containing chamber in which a component part is removably contained through a first opening provided in the inside of the case and opened in an outside surface of the case; wherein a second opening is provided in a wall portion forming the component part containing chamber; a component part containing space communicated with the second opening is provided in the inside of the case; a holder is provided which includes a first plate portion detachably attached to the second opening so as to shut off the second opening, and a second plate portion projecting from the first plate portion and extending in the component part containing space in the condition where the first plate portion shuts off the second opening; a separable body is held in the holder; and the first opening, the component part containing chamber, and the second opening are formed in such sizes that the holder with the separable body held in the holder can be moved from the component part containing space to the exterior of the case.

Additional features and advantages of the present invention are described in, and will be apparent from, the following Detailed Description of the Invention and the figures.

BRIEF DESCRIPTION OF THE FIGURES

FIGS. 11A to 11C illustrate an operation of separating the secondary battery 140.

DETAILED DESCRIPTION

Figure 1:
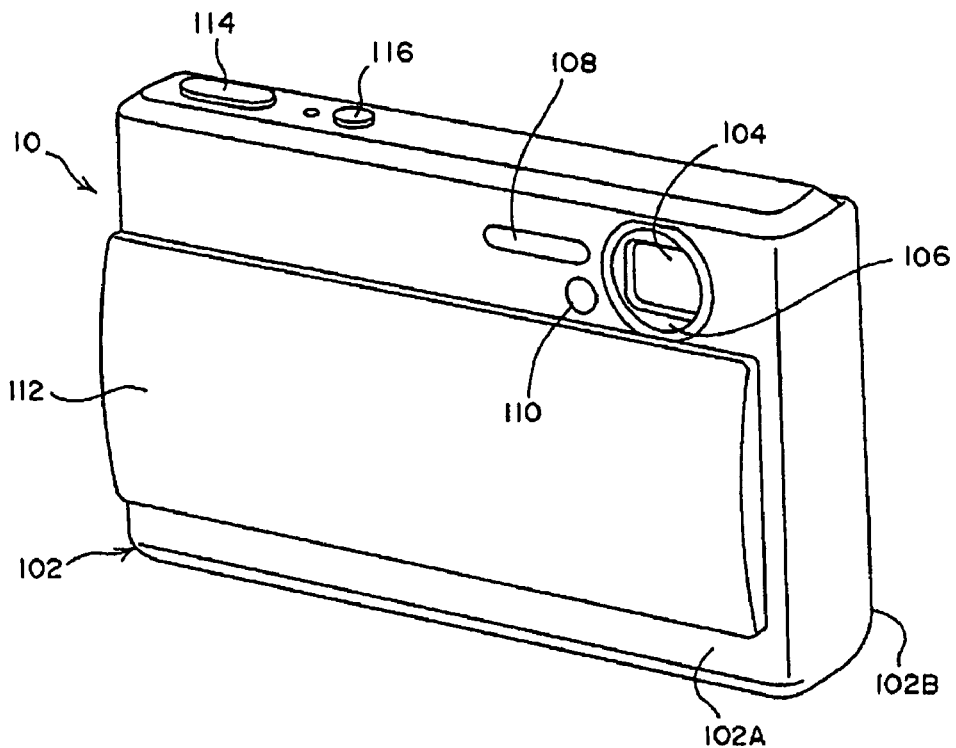
FIG. 1 is a perspective view, as viewed from the front side, of an image pickup apparatus according to a an embodiment.

Enhancement of appearance quality notwithstanding an easy operation of removing a separable body has been realized by a configuration including a second opening provided in a wall portion forming a component part containing chamber, a component part containing space communicated with the second opening, and a holder for holding the separable body.

Now, an embodiment of the present invention will be described below referring to the drawings.

In this embodiment, description will be made of the case where the electronic apparatus is constituted of an image pickup apparatus.

Figure 2:
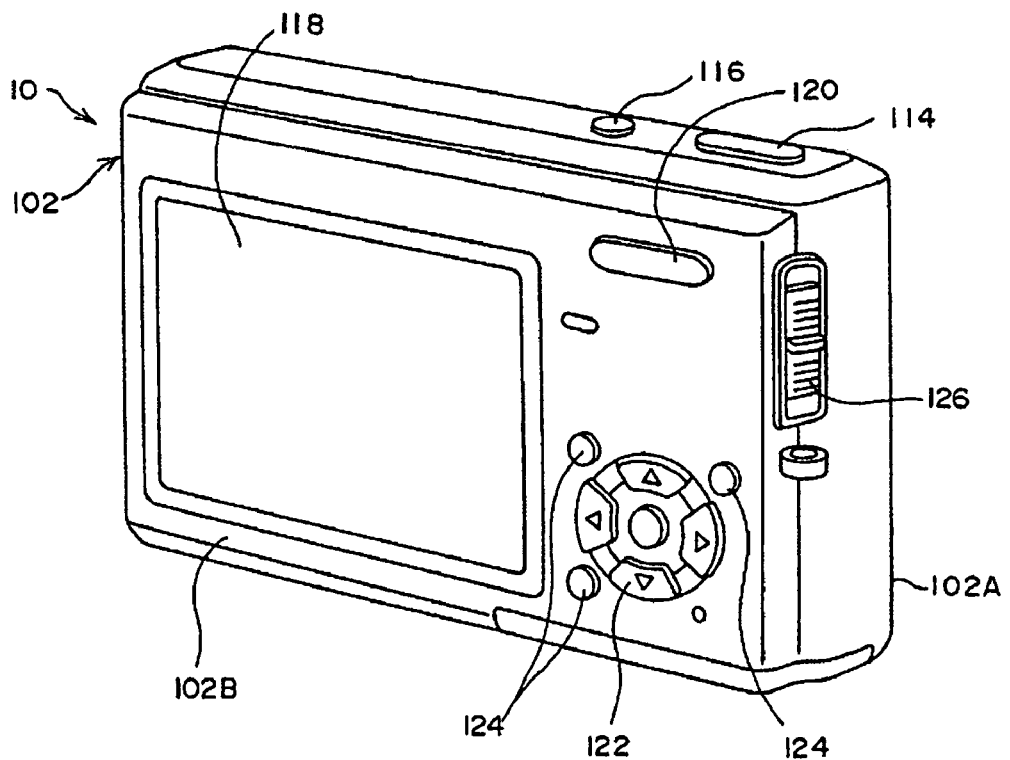
FIG. 2 is a perspective view, as viewed from the rear side, of the image pickup apparatus according to an embodiment.
Figure 3:
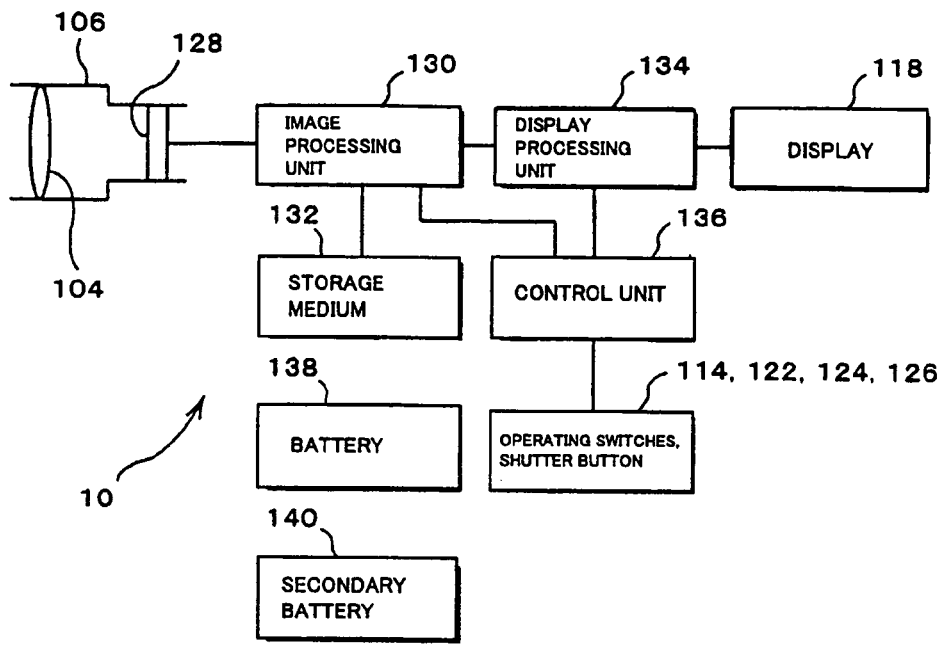
FIG. 3 is a block diagram showing a control system in the image pickup apparatus.

FIG. 1 is a perspective view, as viewed from the front side, of the image pickup apparatus according to the first embodiment, FIG. 2 is a perspective view, as viewed from the rear side, of the image pickup apparatus according to embodiment, and FIG. 3 is a block diagram showing a control system in the image pickup apparatus.

As shown in FIGS. 1 and 2, the image pickup apparatus 10 has a rectangular plate-like case 102 constituting an armor, the case 102 is composed of a front side case 102A and a rear side case 102B mated to each other, the front side case 102A constitutes the front surface of the case 102, and the rear side case 102B constitutes the rear surface of the case 102. Incidentally, the left and right of the case 102 herein are those as viewed from the front side of the case 102.

A lens-barrel 106 for containing an image pickup optical system 104, a flash lamp 108 for emitting image pickup auxiliary light, a self-timer lamp 110 and the like are provided at an upper portion of the front surface of the case 102.

A cover 112 is vertically slidably provided on the front surface of the case 102. The cover 112 is slid between a lower limit position for exposing the lens-barrel 106, the flash lamp 108, and the self-timer lamp 110 to the front side as shown in FIG. 1 and an upper limit position for covering the lens-barrel 106, the flash lamp 108, and the self-timer lamp 110.

A shutter button 114, a power source button 116 and the like are provided at a comparatively left location of the upper surface of the case 102.

A display 118 for displaying pictures such as still picture and motion picture as well as characters, signs and the like, a zoom switch 120 for causing a zooming operation of the image pickup optical system 104, a cross switch 122 for causing various operations, and a plurality of operating buttons 124 are provided on the rear surface of the case 102.

A mode switch 126 for changing over the image pickup apparatus 10 into a still picture pickup mode, a motion picture pickup mode, a reproduction/editing mode and the like is provided on the left side surface of the case 102.

As shown in FIG. 3, the image pickup apparatus 10 has an image pickup device 128 composed of CCD, CMOS sensor or the like for picking up an object image focused by the image pickup optical system 104.

The image picked up by the image pickup device 128 is outputted as an image pickup signal to an image processing unit 130, in which image data is produced based on the image pickup signal, and the image data is recorded on a memory card (storage medium) 132. In addition, the image data is displayed on the display 118 by a display processing unit 134.

Furthermore, the image pickup apparatus 10 includes a control unit 136 including a CPU and the like, for controlling the image processing unit 130 and the display processing unit 134 according to the operations on the shutter button 114, the cross switch 122, the operating buttons 124, and the mode switch 126.

Besides, the image pickup apparatus 10 is provided with a battery (storage type battery) 138 and a secondary battery 140.

The battery 138 is so configured as to supply the display 118, the image pickup device 128, the image processing unit 130, the display processing unit 134, the control unit 136 and the like with electric power.

The secondary battery 140 is disk-like in shape, and is so configured as to back up a holding operation for holding various information such as the settings in the above-mentioned circuit portions and a time-counting operation, by supplying the circuit portions such as the control unit 136 during when the power source for the image pickup apparatus 10 is turned OFF. In this embodiment, the secondary battery 140 corresponds to the separable body which must be separated from the electronic apparatus 10 at the time of discarding the electronic apparatus 10.

Figure 4:
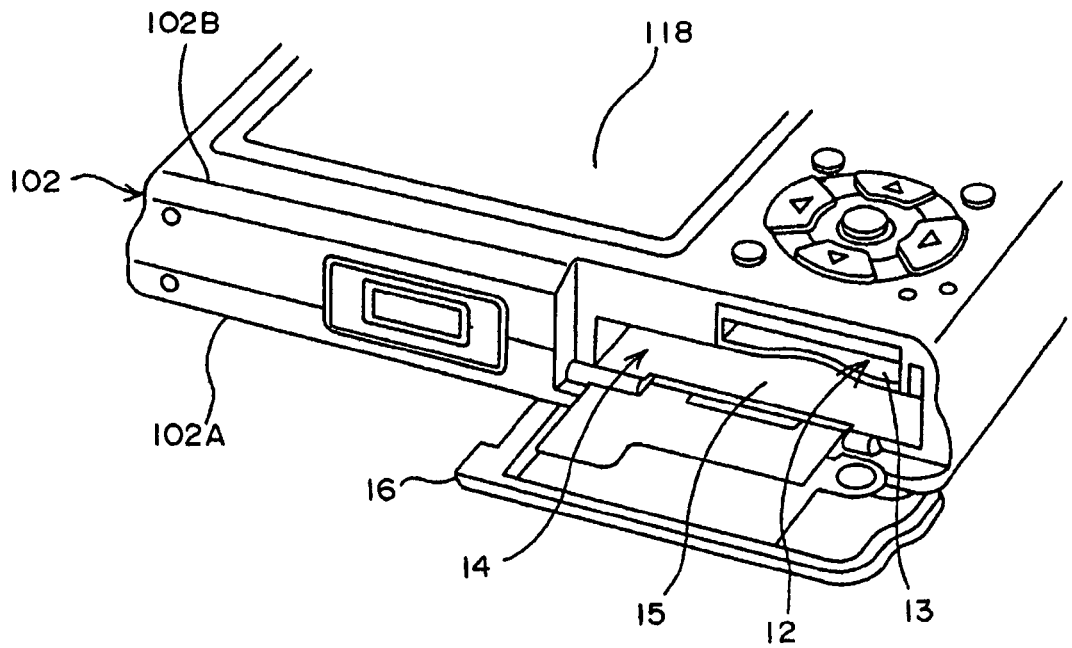
FIG. 4 is a perspective view, as viewed from a skew rear side, of a lower surface of a case 102.
Figure 5:
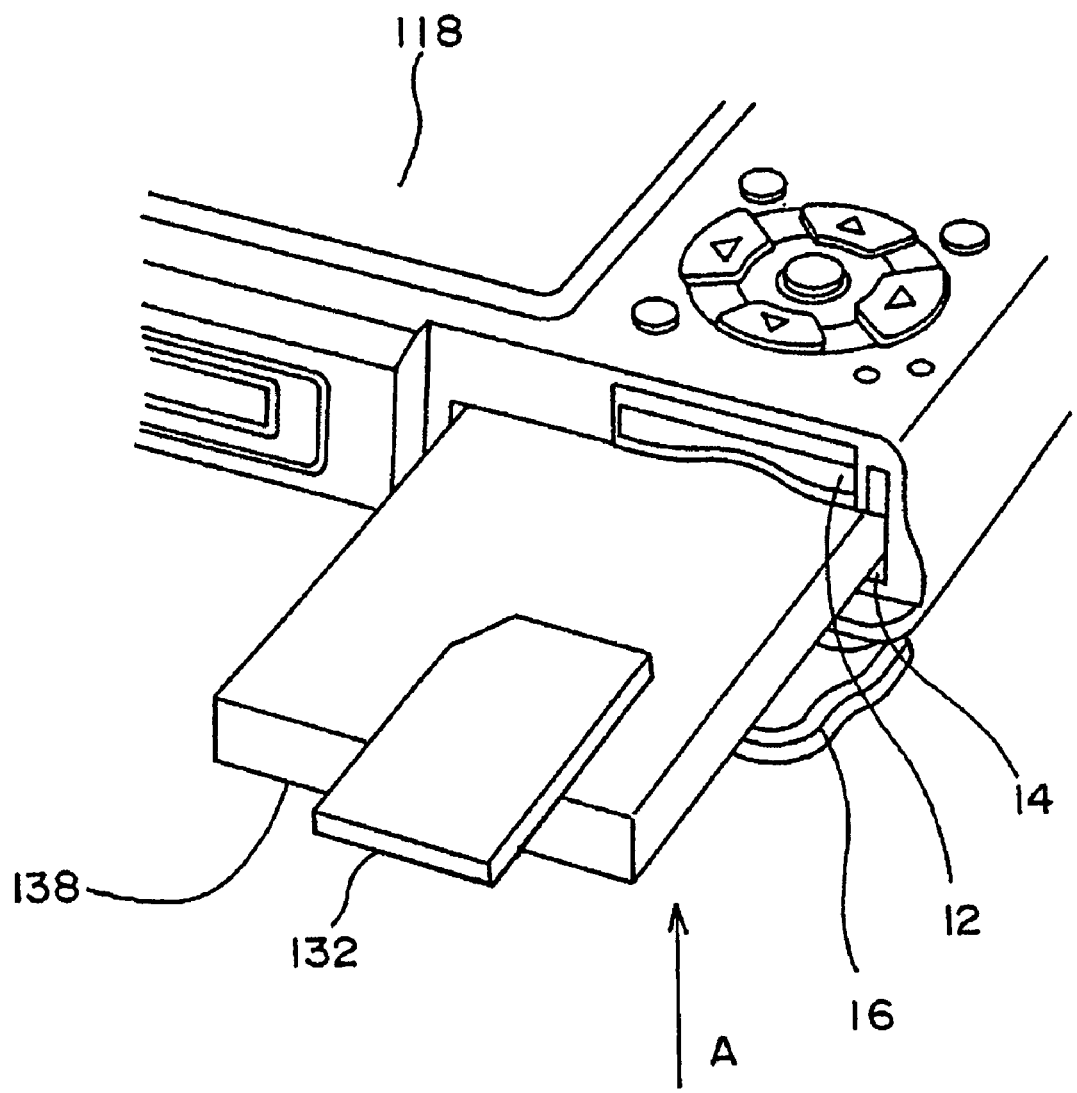
FIG. 5 is a perspective view showing an essential part of the lower surface of the case 102.
Figure 6:
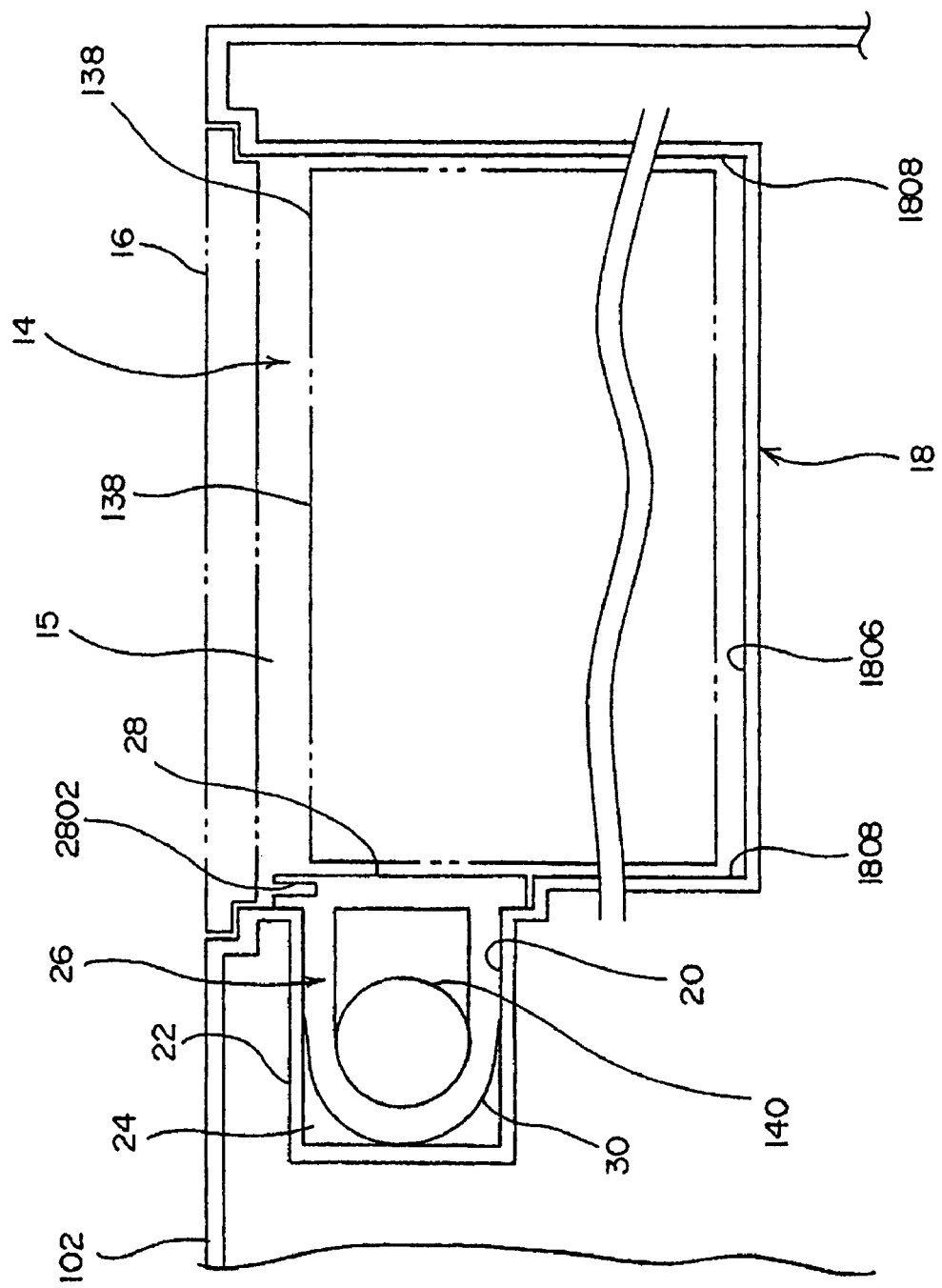
FIG. 6 is a view along arrow A of FIG. 5.

FIG. 4 is a perspective view, as viewed from a skew rear side, of the lower surface of the case 102, FIG. 5 is a perspective view showing an essential part of the lower surface of the case 102, and FIG. 6 is a view along arrow A of FIG. 5.

As shown in FIGS. 4 and 5, a memory containing chamber 12 and a battery containing chamber 14 (corresponding to the component part containing chamber as set forth in claims) are provided in the inside of the case 102, in the state of being arranged in the front-rear direction (thickness direction) of the case 102.

In this embodiment, a housing 103 is incorporated in the rear side case 102B, and the housing 103 is provided with the battery containing chamber 14, an opening 13, a first opening 15, and a second opening 20, which will be described later.

The memory containing chamber 12 is provided to be located at a comparatively rear position in the inside of the case 102, and is so configured as to removably contain the rectangular plate-like memory card 132 via the rectangular opening 13 provided at the portion of the housing 103 located at the lower surface of the case 102.

The housing 103 is provided to be located at a comparatively front position in the inside of the case 102, whereby the battery containing chamber 14 is located at a comparatively front position in the inside of the case 102, and the battery containing chamber 14 is formed as a rectangular plate-like space, as shown in FIG. 6.

Figure 7:
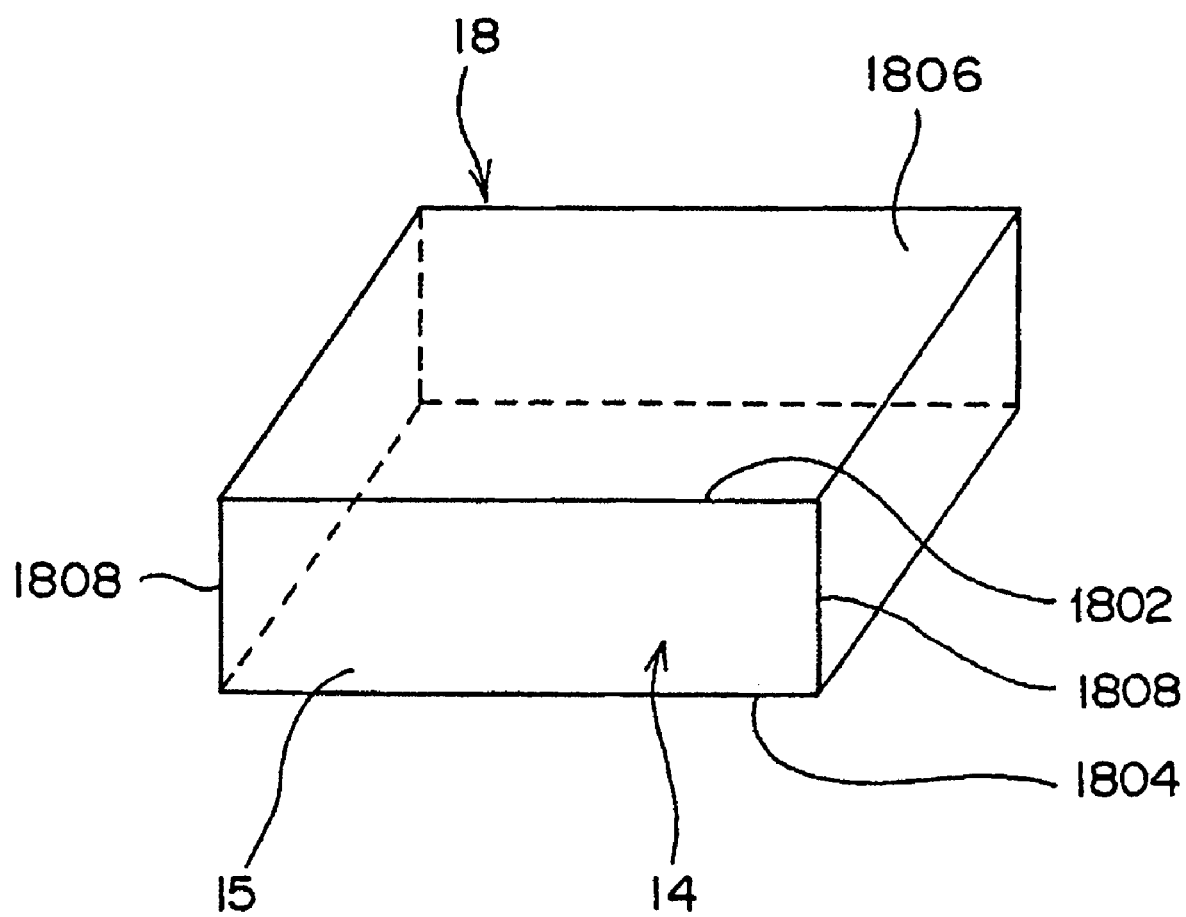
FIG. 7 is a schematic perspective view of a battery containing chamber 14.

The battery containing chamber 14 is formed to be partitioned from the inside of the case 102 by a wall portion 18 shaped in correspondence with the outer shape of the battery 138. More specifically, as shown in a schematic perspective view in FIG. 7, the wall portion 18 is composed of a front wall 1802 and a back wall 1804 which front respectively on the front surface and the back surface of the battery 138 contained, a depth wall 1806 fronting on the tip end surface of the battery 138, and two side walls 1808 fronting respectively on both side surfaces of the battery 138.

The rectangular plate-like battery 138 is removably contained through the rectangular first opening 15 provided in the portion of the housing 103 located at the lower surface of the case 102.

In addition, in this embodiment, the opening 13 and the first opening 15 are so configured as to be opened and closed by a single opening/closing lid 16 hinged to the portion of the housing 103 located at the lower surface of the case 102.

Figure 8:
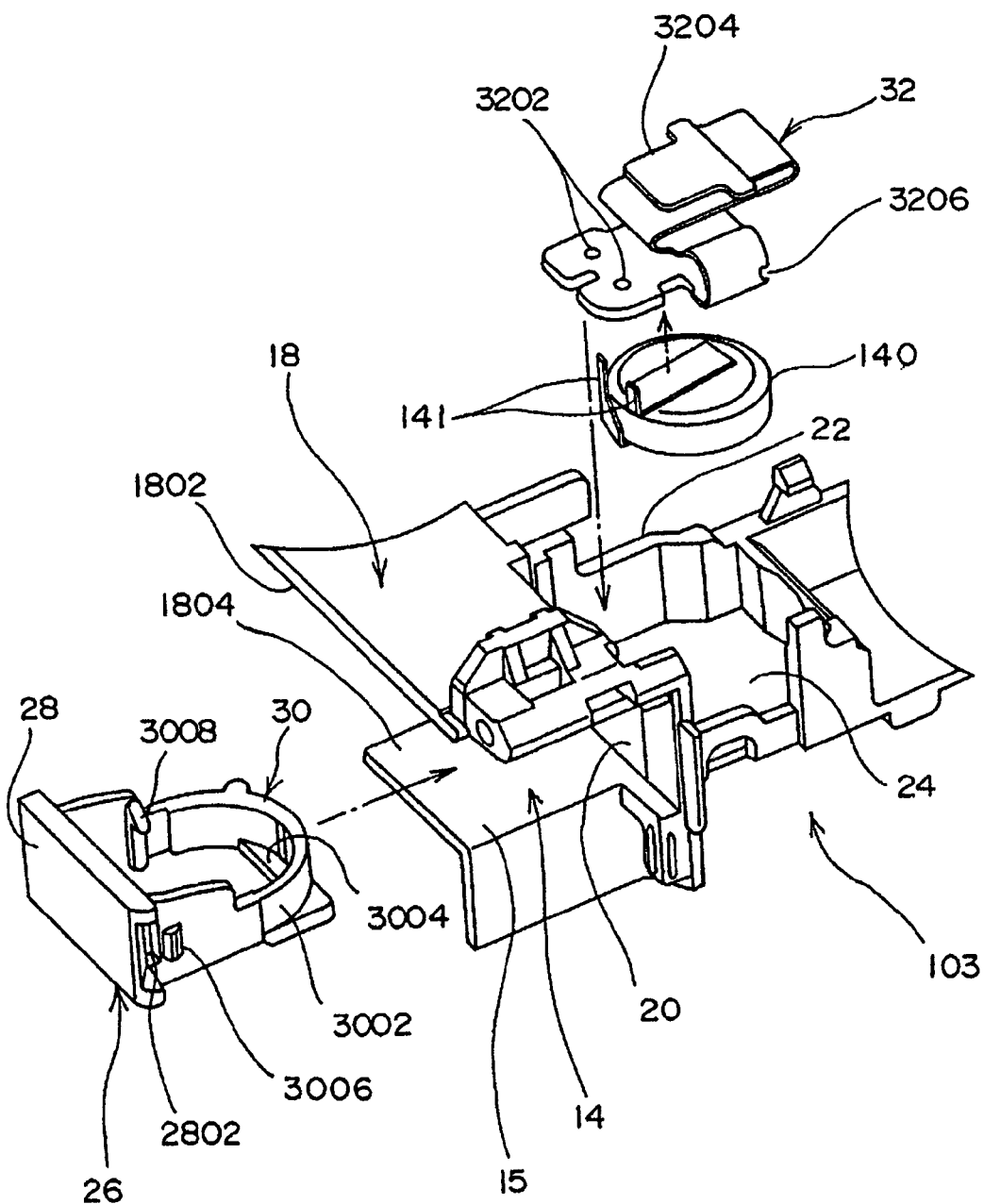
FIG. 8 illustrates the assemblage of a secondary battery 140 and a holder 26.

As shown in FIG. 6, the second opening 20 is provided at the location of one side wall 1808 in the vicinity of the first opening 15, and a component part containing space 24 communicated with the second opening 20 is provided in the inside of the case 102. In this embodiment, the component part containing space 24 is partitioned from the inside of the case 102 by a wall portion 22 connected to the one side wall 1808, and the component part containing space 24 is opened on the side of the front surface of the case 102, as shown in FIG. 8.

The disk-like secondary battery 140 is removably mounted in a holder 26, and is contained in the component part containing space 24 together with the holder 26.

The holder 26 includes a first plate portion 28 detachably attached to the second opening 20 to shut off the second opening 20, and a second plate portion 30 extending in the component part containing space 24 in the condition where the first plate portion 28 shuts off the second opening 20.

The second plate portion 30 is composed of a peripheral wall 3002 formed by projecting plates from both sides of the first plate portion 28 and connecting the tip ends of the projected plates to each other, and a bottom wall 3004 provided at a bottom portion of the tip end of the peripheral wall 3002.

In this embodiment, the holder 26 has a structure in which in the condition where the first plate portion 28 shuts off the second opening 20, the surface of the first plate portion 28 is flush with the side surface 1808 in the periphery of the second opening 20, while an end portion of the first plate portion 28 fronts on the first opening 15, the end portion of the first plate portion 28 fronting on the first opening 15 is provided with a groove 2802 in which a hooking means such as a minus screw driver is locked, and, further, the end portion of the first plate portion 28 fronting on the first opening 15 is provided with an inclined surface 2804 for guiding the hooking means into the groove 2802.

Besides, in this embodiment, as shown in FIG. 8, an engaging portion 3006 is provided at a portion, in the vicinity of the first plate portion 28, of the peripheral wall 3002, and the engaging portion 3006 is engaged with and disengaged from an engaging portion (not shown) provided at a position in the vicinity of the second opening 20. In addition, as shown in FIG. 9, the peripheral wall 3002 is provided with two lock pawls 3008 for preventing the slip-off of the secondary battery 140 mounted in the holder 26.

The first opening 15, the battery containing chamber 14, and the second opening 20 are formed in such sizes that the holder 26 with the secondary battery 140 mounted therein can be moved from the component part containing space 24 to the exterior of the case 102.

Now, assemblage of the image pickup apparatus 10 will be described below.

Figure 9:
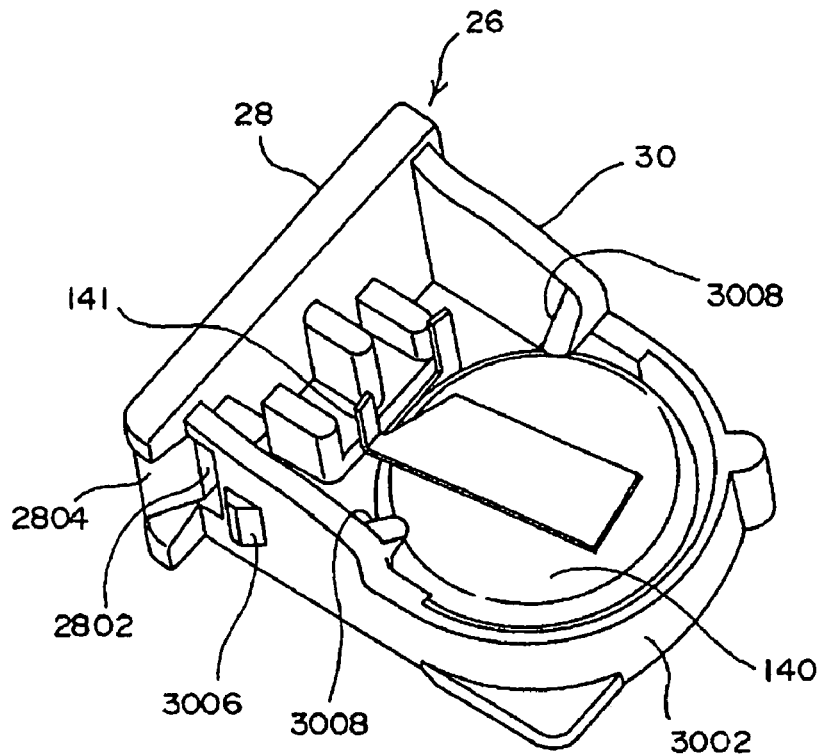
FIG. 9 illustrates the condition where the secondary battery 140 and the holder 26 are mounted in position.
Figure 10:
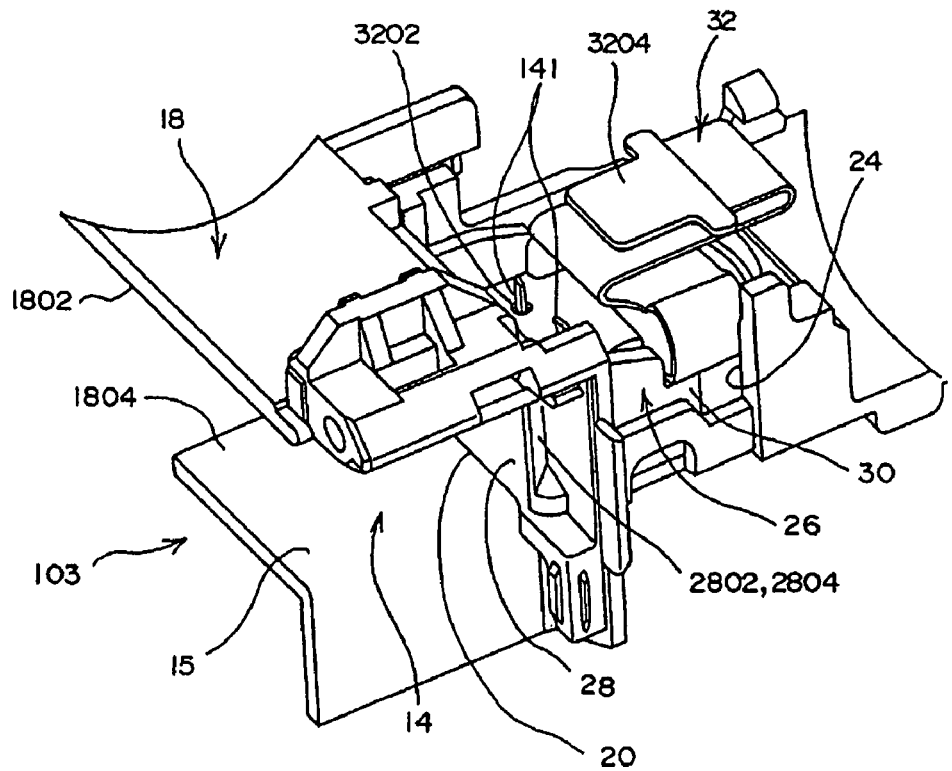
FIG. 10 illustrates the condition where the secondary battery 140 and the holder 26 are contained in a containing space 24.

FIG. 8 illustrates the assemblage of the secondary battery 140 and the holder 26, FIG. 9 illustrates the condition where the secondary battery 140 and the holder 26 are mounted in position, and FIG. 10 illustrates the condition where the secondary battery 140 and the holder 26 are contained in the containing space 24.

First, as shown in FIG. 8, the secondary battery 140 and the flexible substrate 32 are connected to each other.

The flexible substrate 32 is formed in an L shape, and functions to electrically connect the secondary battery 140 and the circuit portions such as the control unit 136 mentioned above to each other. The flexible substrate 32 is provided with connection holes 3202 in one end in the longitudinal direction thereof, and with a connection portion 3204, for connection to a connector on the side of the control unit 136, at the other end in the longitudinal direction thereof. In addition, the flexible substrate 32 is provided with a notch 3206 in an intermediate portion thereof so that the flexible substrate 32 will be easily broken when a stress in the longitudinal direction is exerted thereon.

As shown in FIG. 8, connection terminals 141 formed of conductive material are preliminarily fixed, by spot welding or the like, respectively to electrodes provided on the upper surface and the lower surface of the secondary battery 140, the connection terminals 141 are passed through the connection holes 3202 formed in the flexible substrate 32, the connection terminals 141 are soldered to the connection holes 3202, and the connection portion 3204 of the flexible substrate 32 is connected to the above-mentioned connector.

Next, the holder 26 is inserted into the battery containing chamber 24 through the first opening 15, and the second plate portion 30 of the holder 26 is inserted into the second opening 20. This engages the engaging portion 3006 of the holder 26 with the above-mentioned engaging portion of the side wall 22, whereby the condition where the first plate portion 28 shuts off the second opening 20 is maintained, and, in this condition, the second plate portion 30 of the holder 26 protrudes to the outside of the battery containing chamber 24.

Here, as shown in FIGS. 9 and 10, the secondary battery 140 connected to the flexible substrate 32 is mounted to the second plate portion 30 of the holder 26. In this manner, the secondary battery 140 and the holder 26 are mounted into the housing 103.

Subsequently, the housing 103 in this condition is mounted to the rear side case 102B. This results in that the secondary battery 140 is disposed in the component part containing space 24, together with the holder 26.

Then, the front side case 102A is mounted to the rear side case 102B to thereby assemble the image pickup apparatus 10, whereby the component part containing space 24 for containing the secondary battery 140 is formed between the side wall 22 of the housing 103 and the front side case 102B.

Now, separation of the secondary battery 140 from the image pickup apparatus 10 will be described below.

FIGS. 11A to 11C illustrate an operation of separating the secondary battery 140.

As shown in FIG. 11A, the opening/closing lid 16 is opened to open the first opening 15, and the battery 138 is drawn out from the battery containing chamber 14 to the outside of the case 102.

Next, as shown in FIG. 11B, the tip end of the hooking means 2 such as a minus screw driver is inserted through the guide surface 2804 into the groove 2802, and, in this condition, the hooking means 2 is rotated, whereby the first wall portion 28 is disengaged from the second opening 20, and the holder 26 is moved from the component part containing space 24 into the battery containing chamber 14. In this instance, the engaging portion 3006 of the holder 26 and the above-mentioned engaging portion of the side wall 22 are disengaged from each other.

When the holder 26 is moved from the component part containing space 24 into the battery containing chamber 14, a force in the direction for pulling the flexible substrate 32 is exerted on the flexible substrate 32, whereby the flexible substrate 32 is easily broken, starting from the notch 3206.

Alternatively, even where the notch 3206 shown in FIG. 8 is not provided, since the flexible substrate 32 is folded in a direction orthogonal to the direction for drawing out the battery 140, the movement of the holder 26 causes a twisting force to act on the fold portion of the folding of the flexible substrate 32, whereby the flexible substrate 32 can be easily broken, starting from the fold portion.

When the flexible substrate 32 is broken, the holder 30 and the secondary battery 140 held in the holder 30 are drawn out through the second opening 20 into the battery containing chamber 14, and, further, are taken out from the battery containing chamber 14 to the outside of the case 102 through the first opening 15.

In this manner, the secondary battery 140 is separated from the image pickup apparatus 10.

As has been described above, according to this embodiment, the wall portion 18 defining the battery containing chamber 14 is provided with the second opening 20, the component part containing space 24 communicated with the second opening 20 is provided in the inside of the case 102, the holder 26 is provided which includes the first plate portion 28 detachably attached to the second opening 20 to shut off the second opening 20, and the second plate portion 30 projecting from the first plate portion 28 and extending in the component part containing space 24 in the condition where the first plate portion 28 shuts off the second opening 20, and the secondary battery 140 is held in the holder 26; therefore, the second opening 20 and the holder 26 are not exposed to the outside of the case 102. Accordingly, the appearance quality of the image pickup apparatus 10 is not impaired, and, since the secondary battery 140 can be taken out of the component part containing space 24 together with the holder 26 at the time of discarding the image pickup apparatus 10, the operation of removing the secondary battery 140 can be easily carried out.

In addition, according to this embodiment, an end portion of the first plate portion 28 of the holder 26 fronts on the first opening 20 in the condition where the first plate portion 28 shuts off the second opening 20, and the end portion of the first plate portion fronting on the first opening 20 is provided with the groove 2802 in which the hooking means such as a minus screw driver is locked; therefore, the holder 26 can be taken out of the component part containing space 24 by only engaging the hooking means with the groove 2802 and operating the hooking means, which is advantageous in enhancing the workability in separating the secondary battery 140.

In addition, in this embodiment, the surface of the first plate portion 28 is so formed as to be flush with the side wall 1808 being a wall surface in the periphery of the second opening 20 in the condition where the first plate portion 28 shuts off the second opening 20; therefore, the surface of the first plate portion 28 guides the outside surface of the battery 138 at the time of mounting and dismounting the battery 138 into and from the battery containing chamber 14, which is advantageous for smoothly mounting and dismounting the battery 138.

Besides, in this embodiment, since a partial assembly having the secondary battery 140 connected to the flexible substrate 32 can be preliminarily prepared and the partial assembly can be mounted to the holder 26, efficiency in the operation of mounting the secondary battery 140 and the holder 26 can be enhanced advantageously.

Incidentally, while the configuration in which the first opening 15 is opened and closed by the opening/closing lid 16 has been described in this embodiment, the above-mentioned effects can naturally be displayed even in the case where the opening/closing lid 16 is absent or where the second opening 28 is exposed directly to the appearance surface.

In addition, while the second opening 20 has been provided in one of the two side walls 1808 of the wall portion 18 constituting the battery containing chamber 14 in this embodiment, the portion provided with the second opening 20 may be any one of the other side wall 1808, the front wall 1802, and the back wall 1804.

Besides, while the second opening 20 has been provided in the wall portion 18 of the battery containing chamber 14 in this embodiment, the portion provided with the second opening 20 may be a wall portion constituting the memory containing chamber 12. In addition, where the image pickup apparatus 10 is provided with a chamber for containing an adapter operated by being electrically connected to the electronic apparatus, the second opening 20 may be provided in a wall portion constituting the adapter containing chamber.

Besides, while the notch 3206 has been used for easy breaking of the flexible substrate 32 in this embodiment, a configuration may be adopted in which the notch 3206 is not used and in which a fold portion of the flexible substrate 32 is broken through twisting. Alternatively, for example, the flexible substrate 32 may be provided with a thinned portion. Thus, there can be contemplated a variety of configurations for easy breaking of the flexible substrate 32.

In addition, while the secondary battery 32 and the control unit 136 have been connected by the flexible substrate 32, lead wires may be used in place of the flexible substrate 32. Where the lead wires are used, it suffices to set the strength of the lead wires in such a manner that the lead wires can be broken easily.

Besides, while the case of containing the rectangular plate-like battery 138 in the battery containing chamber 14 has been described in this embodiment, the shape of the battery may be a prism or may be a shape having a curved surface such as a cylinder. In addition, a variety of dry cells may be used in place of the battery 138.

Besides, while the case of separating the secondary battery has been described in this embodiment, the present invention can naturally be applied to the cases of separating any of various electrical component parts such as a primary battery, a flash capacitor, and the like.

In addition, while the image pickup apparatus has been shown as an example of the electronic apparatus in this embodiment, the present invention is applicable to a variety of electronic apparatuses.

INDUSTRIAL APPLICABILITY

According to the present invention, the appearance quality of the electronic apparatus is not impaired, since the second opening and the holder are not exposed to the outside of the case. In addition, since the secondary battery and electrical component parts can be taken out of the component part containing space together with the holder at the time of discarding the electronic apparatus, the operation of removing the secondary battery and the electrical component parts can be carried out easily.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An electronic apparatus comprising:
a case constituting an armor; and
a component part containing chamber in which a component part is removably contained through a first opening provided in an inside of said case and opened in an outside surface of said case; wherein
a second opening is provided in a wall portion forming said component part containing chamber;
a component part containing space communicated with said second opening is provided in the inside of said case;
a holder is provided which comprises a first plate portion detachably attached to said second opening so as to shut off said second opening, and a second plate portion projecting from said first plate portion and extending in said component part containing space in the condition where said first plate portion shuts off said second opening;
a separable body is held in said holder; and
said first opening, said component part containing chamber, and said second opening are formed in such sizes that said holder with said separable body held in said holder can be moved from said component part containing space to the exterior of said case.

2. An electronic apparatus as set forth in claim 1, wherein said separable body is a secondary battery or electric component part which must be separated from said electronic apparatus at the time of discarding said electronic apparatus.

3. An electronic apparatus as set forth in claim 1, wherein a surface of said first plate portion is so formed as to be flush with a wall surface in the periphery of said second opening in the condition where said first plate portion shuts off said second opening.

4. An electronic apparatus as set forth in claim 1, wherein an end portion of said first plate portion fronts on said first opening in the condition where said first plate portion shuts off said second opening, and a groove is formed in said end portion, fronting on said first opening, of said first plate portion.

5. An electronic apparatus as set forth in claim 4, wherein said groove is so formed that a hooking means such as a minus screw driver is locked therein.

6. An electronic apparatus as set forth in claim 1, wherein said second opening is provided in the vicinity of said first opening.

7. An electronic apparatus as set forth in claim 1, wherein said component part containing chamber is a chamber for containing a storage type battery or dry battery for supplying said electronic apparatus with electric power.

8. An electronic apparatus as set forth in claim 1, wherein said component part containing chamber is a chamber for containing a storage medium for transfer of data between the storage medium and said electronic apparatus, or for containing an adapter operated by being electrically connected to said electronic apparatus.

9. An electronic apparatus as set forth in claim 1, wherein said separable body is connected to a circuit portion provided in said electronic apparatus through a flexible substrate or lead wires, and said flexible substrate or lead wires are broken when said separable body is drawn out from said containing space to the exterior of said case together with said holding member.

10. An electronic apparatus as set forth in claim 1, wherein an opening/closing lid is provided for opening and closing said first opening.

11. An electronic apparatus as set forth in claim 1, wherein said component part containing chamber is provided in a housing incorporated in said case, and said wall portion, said first opening and said second opening are provided in said housing.

* * * * *